Patented July 18, 1944

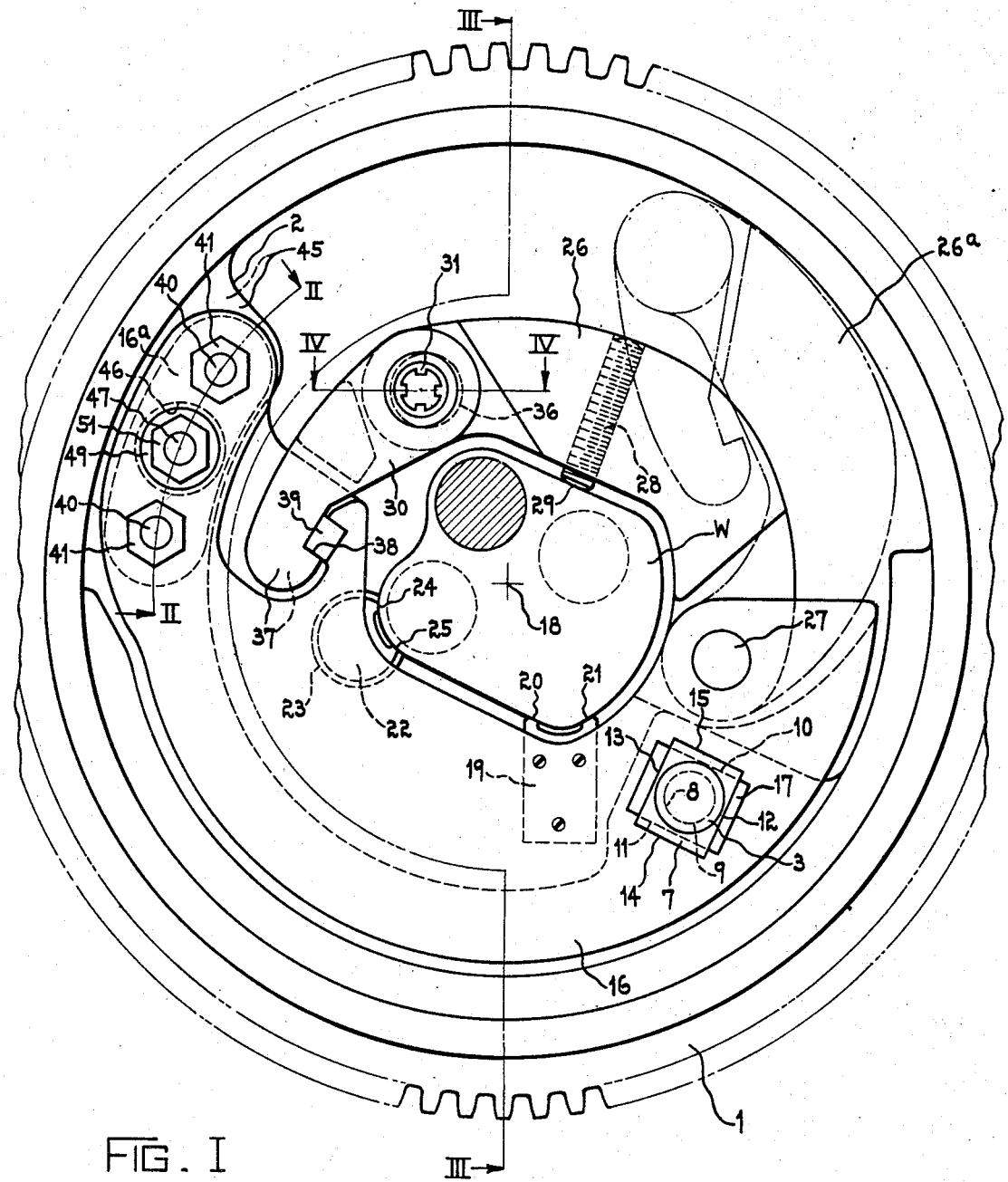
FIG. I

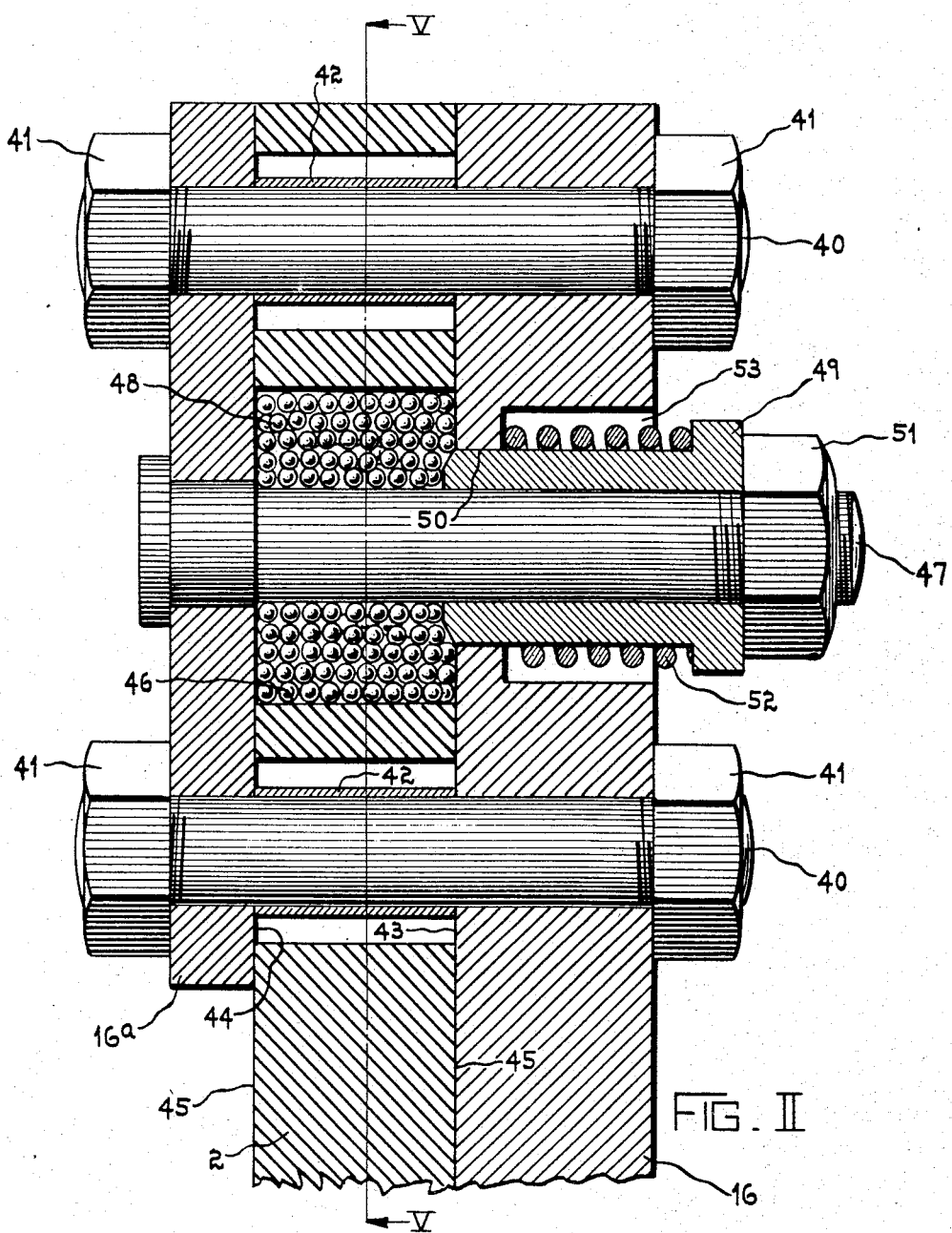

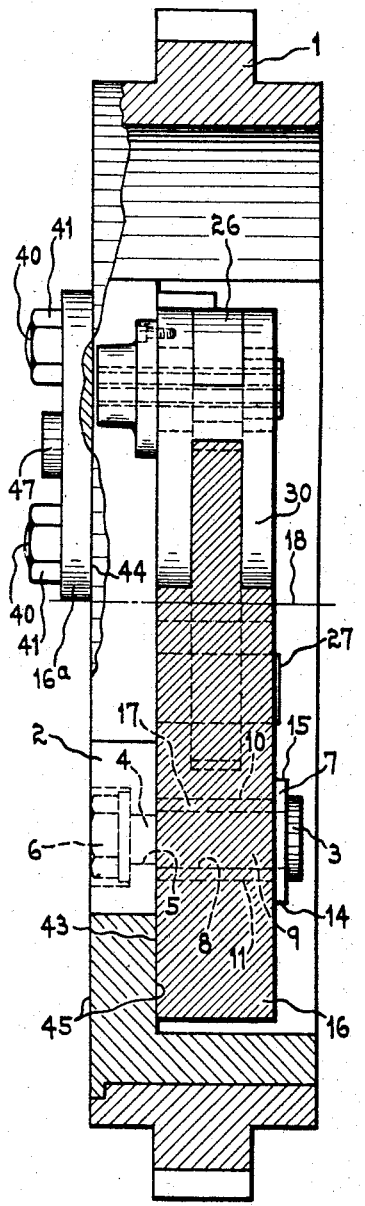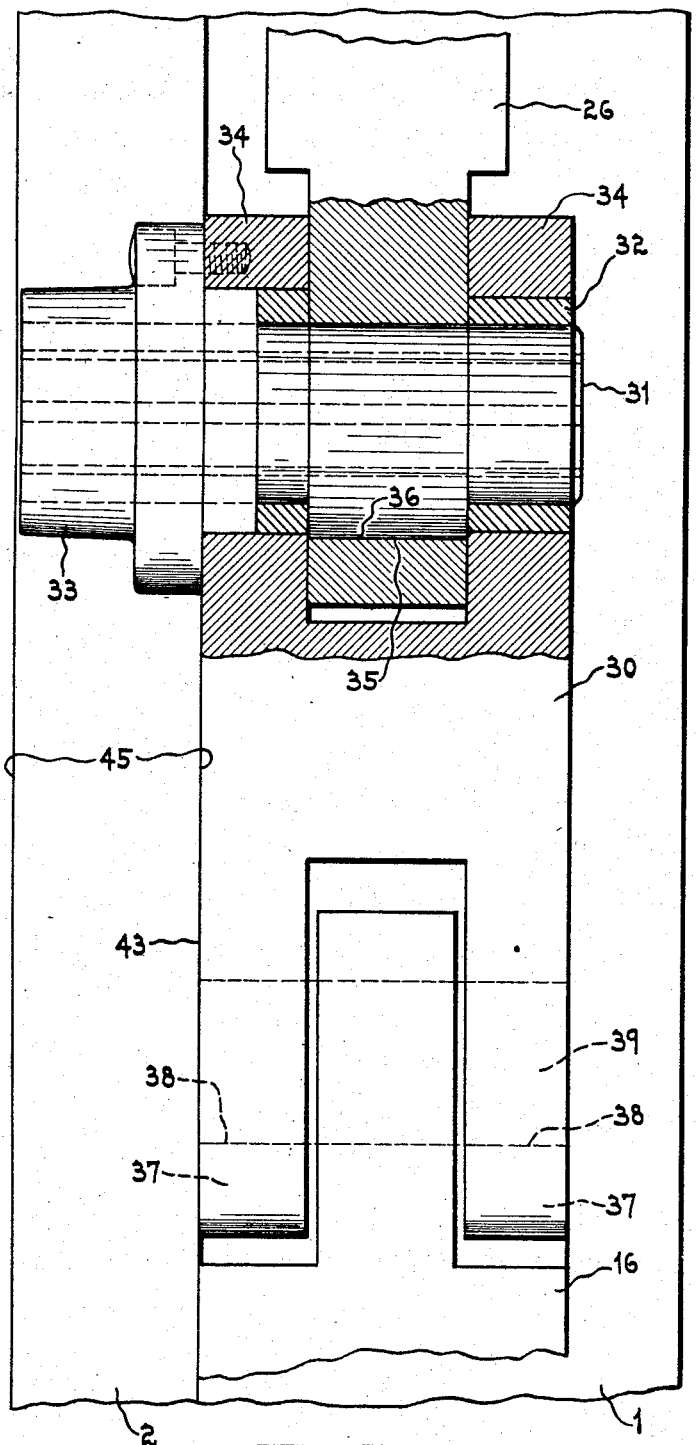

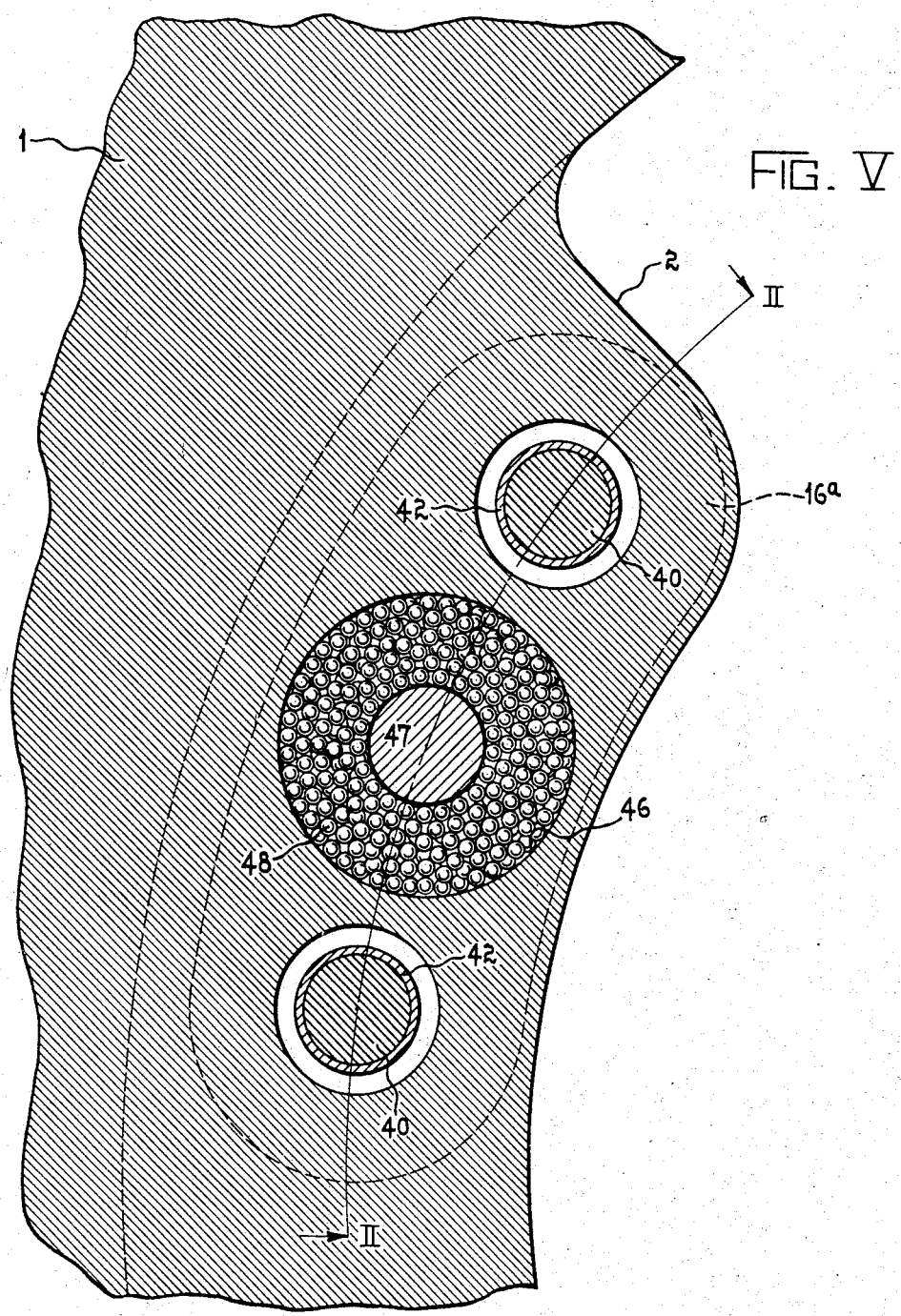

2,354,009

UNITED STATES PATENT OFFICE 2,354,009

CRANKSHAFT CHUCK

William F. Groene and Harold J. Siekmann, Cincinnati, Ohio, assignors to The R. K. Le Blond Machine Tool Company, Cincinnati, Ohio, a corporation of Delaware Application November 14, 1939, Serial No. 304,382

9 Claims. (Cl. 82—40)

This invention pertains to chucking devices for machine tools and is particularly related to the chucking of rough, irregular, prelocated crankshafts in lathes, especially of the center drive type, in which the line bearings of the crankshaft are to be simultaneously machined in a single operation.

One of the objects of this invention is to provide a chucking device having a floating member adapted to engage a rough, irregular web of a prelocated web of a crankshaft to be machined and to provide, in connection with this floating member, means for positively locking said member to the chuck body of the work spindle of the lathe after said member has been engaged on the rough irregular web of the crankshaft.

Another object of this invention is to provide in a chucking device, having a floatingly mounted member for engaging a rough irregular work piece prelocated in the lathe, a locking device which will positively lock the work engaging member to the chuck body on the work spindle of the lathe without moving said work engaging member from its position established by its floating engagement with the work piece in the chuck to thereby prevent any displacement of the work upon final locking of the work engaging member to the chuck body.

Another object of this invention is to provide a locking mechanism of the above character which utilizes a medium which is completely equalizing during the initial stages of the locking process but which forms a solid abutment preventing all further movement of the work engaging member relative to the chuck body at the completion of the final locking.

Another object of this invention is to provide a locking device for a chuck of the above character which utilizes a shot medium which interconnects the floating member with the chuck body and which medium may be acted upon to form a solid rigid interconnecting abutment between the work engaging member and the chuck body at the time of final locking of said work engaging member to the chuck body.

A still further object of this invention is to provide a chuck having a floatingly mounted work engaging member which has a fixed abutment and an equalizing abutment for engaging the rough work surface and clamping means for securely binding said abutment surfaces to a rough irregular prelocated work piece in the chuck.

Another object of this invention is to provide in a chuck, having a floatingly mounted rough work engaging member, a fixed work engaging abutment having a pair of surfaces and an equalizing work engaging abutment having a pair of work engaging surfaces and a clamping means operating in conjunction with said abutment whereby the floating member may be positively and securely clamped to the rough irregular work piece while in prelocated position without distorting the work piece from its true prelocated position on the axis of the chuck.

Further features and advantages of this invention will appear from the detailed description of the drawings in which:

Fig. I is an axial view of a center drive ring gear chucking device incorporating the features of our invention.

Fig. II is an enlarged sectional view through the locking device substantially on the line II—II of Fig. I, particularly showing the shot chamber and the operating mechanism for rendering the shot effective for positively locking the work engaging member to the ring gear of the chucking device.

Fig. III is a fragmentary sectional view substantially on the line III—III of Fig. 1.

Fig. IV is an enlarged fragmentary sectional view through the eccentric clamping mechanism shown on the line IV—IV of Fig. I.

Fig. V is an enlarged sectional view through the locking mechanism shown on line V—V of Fig. II.

This arrangement is shown applied to a ring gear 1 of a center drive lathe in which is formed an integral web 2. Fixed in this web is a stud 3 having a reduced end 4 fitting precisely in a bore 5 in this web 2 and locked in place by a suitable nut and washer 6. About this stud 3 is journaled the square bushing 7 having a bore 8 journaled on the bearing surface 9 of this stud 3 and having an outside square formed by the surfaces 10, 11, 12, and 13 and having a projecting head portion formed by the extended surfaces 14 and 15.

The segmental work engaging member 16 has a slotted bore 17 whose sides nicely fit and slide on the surfaces 10 and 11 of the square bushing 7 and is somewhat elongated so as to permit free movement of this segmental piece 16 perpendicular to these contact surfaces in order that these surfaces of the slot 17 do not at any time engage the faces 12 and 13 of the square bushing 7. By this arrangement the segmental piece 16 is floatingly mounted on the chuck body for radial sliding movement and for pivotal movement about the stud 3 so that it may assume any position relative to the work axis of the chuck as dictated by its engagement with the work W.

In this segmental member 16 is a fixed abutment jaw 19 having work engaging surfaces 20 and 21. Also in this segmental member 16 is an equalizing work engaging jaw 22 arranged to rotate in a suitable bearing 23 in the segmental member 16 and having work engaging surfaces 24 and 25. These various work engaging surfaces 20, 21, 24 and 25 are arranged to properly seat themselves against the rough periphery of a web W of a crankshaft prelocated on the axis of the chuck when this segmental member is swung upwardly about the stud 3 and along the surfaces 10 and 11 of the square bushing 7. In order to positively draw these surfaces into engagement with the work and securely hold them against it, an appropriate clamping means, comprising the clamp bar 26 pivotally mounted on a pin 27 fixed in the segmental member 16, is provided having an abutment screw 28 arranged to engage the rough irregular web W at a point 29 when swung over the work from the position 26a indicated in Fig. I. A latch 30 has an eccentric 31, best seen in Fig. IV, journaled in suitable bearings 32 and 33 in its bifurcated end portion 34. This eccentric connects this latch to the clamp bar 26 by means of its eccentric portion 35 which is appropriately journaled in the bore 36 of the clamp bar 26, so that when the eccentric 31 is rotated one way or the other the latch 30 is drawn closer or moved further away from the clamp bar 26. The outer end of the latch 30 has a bifurcated hooked portion 37 having latching surfaces 38 for engagement around the keeper bar 39 fixed in the segmental member 16. Thus by tightening the eccentric 31 to draw up the latch 30 closer to the clamp bar 26 its abutment screw 28 will bear against the work at 29 to thereby securely draw the segmental member 16 with its abutment surfaces 20, 21, 24 and 25 securely against the work piece without distorting it from its true center position on the axis 18 since the mounting on the stud 3 is fully floating to permit movement of this segmental member 16 in accordance with the rough irregularity of the work surface being gripped by this work engaging member.

Having thus bound this work engaging member securely on the work piece it is then the problem to lock this assembly securely to the body of the ring gear 1 so as to securely hold the work in this proper precentered position during the operation of cutting tools on the various work surfaces to be machined on the crankshaft W. In order to do this a locking mechanism, shown best in Figs. II and V is provided. This mechanism consists of a plate 16a securely bound to the segmental member 16 by appropriate studs 40 and nuts 41 which pass through spacing bushings 42 to keep the surface 43 of the segmental member 16 and the surface 44 of the plate 16a properly spaced so that these surfaces have free nicely sliding movements with the surfaces 45 machined on each side of the integral web 2 of the ring gear 1, so that this segmental member 16 may have free floating movement relative to the web 2 of the ring gear insofar as the studs and nuts 41 are concerned.

In order to lock the member 16 to the member 2 a chamber formed by the bore 46 is formed in the web 2 and substantially concentric therein is provided the clamping stud 47 which is fixed in the member 16a against rotation and extends through the bore 46 through the segmental member 16. In this bore 46, surrounding the clamping stud 47 and confined by the bore 46 and the surfaces 43 and 44 of the segmental member 16 and the plate 16a respectively, is shot 48. About this stud 47 is slidingly mounted a bushing 49 which is arranged to pass through a bore 50 formed in the segmental member 16, Fig. II, and extends into bore 46 and engages the shot 48 when moved along the stud during the clamping operation effected by appropriately rotating the locking nut 51. A suitable spring 52 carried in the counterbore 53 in the segmental member 16 serves to withdraw this bushing 49 as the nut 51 is backed off in unlocking the device so as to free pressure on the shot 48 in the bore 46 to permit free relative floating movement of the segmental member 16 and the web 2. It is to be noted that after the segmental member 16 has been appropriately clamped securely on the web W of the crankshaft prelocated on the axis 18 of the chuck the locking nut 51 is then tightened down forcing the bushings 49 into engagement with the shot 48 which causes the shot to compress to a point where it forms a solid mass of non-resilient and immovable material in the bore 46 so that no relative movement can take place between the stud 47 and the bore 46 under these final locked up conditions. It is also to be noted that in tightening down the nut 51 to force the bushing 49 against the shot 48, no relative displacement of the crankshaft and its clamping means locked to it will take place since the shot is freely equalizing under these conditions to orient itself to completely fill this chamber formed by the bore 46 without causing relative movement between segmental member 16 and the web 2 of the ring gear 1. It will thus be seen that with this locking mechanism we have provided a means whereby the segmental work engaging member may be locked positively to the work engaging ring gear while at the same time preventing any possible distortion and re-orientation of the work engaging mechanism during this process of positively locking it to the ring gear 1.

Having thus fully set forth and described in our invention what we claim as new and desire to secure by United States Letters Patent is:

1. In a chuck, a rotary chuck body, a work engaging member floatingly mounted on said chuck body, means on said member for engaging a prelocated work piece in said chuck, a clamp bar pivotally mounted on said member and adapted to be swung over said work piece, work engaging means on said clamp to contact said work piece, a latch pivotally mounted on the outer end of said clamp bar, having means engaging a keeper fixed in said work engaging member, eccentric clamping means inter-connecting said clamp bar and said latch whereby operation of said eccentric means causes said clamp bar to engage its abutment with said work piece to securely bind said work piece to said work engaging member, and means for locking said work engaging member to said chuck body when said work engaging member is bound on said work piece.

2. In a chuck, a rotary chuck body, a work engaging member floatingly mounted on said chuck body, a fixed work engaging abutment on said member, an equalizing work engaging abutment on said member, a clamp bar pivotally mounted on said member, a work engaging abutment on said clamp bar, a latch pivotally mounted on said clamp bar and connected thereto by eccentric clamping means, a keeper in said member adapted to be engaged by said latch, said eccentric means being actuatable to cause said clamping means to urge said work piece into firm engagement with said abutments of said work engaging member, and means for locking said work engaging member to said chuck body.

3. In a chuck, a rotary chuck body, a work engaging member floatingly mounted on said chuck body, and means for locking said work engaging member to said chuck body when engaged on a prelocated work piece in said chuck comprising a shot chamber interconnecting said work engaging member and said chuck body, and means for applying pressure to the shot in said chamber to form a rigid medium interconnecting said member and said chuck body.

4. In a chuck, a rotary chuck body, a work engaging member floatingly mounted on said chuck body, and means for locking said floating member to said chuck body comprising a chamber in said body, a clamping stud carried by said work engaging member and passing through said chamber and having relative floating movement therein, shot in said chamber and surrounding said stud, and means for applying pressure to said shot in said chamber to cause it to form a rigid medium between said chamber and said stud, to prevent all relative floating movement in said stud relative to said chuck body.

5. In a chuck, a rotary chuck body, a work engaging member floatingly mounted on said chuck body, a chamber in said chuck body, a clamping stud fixed in said work engaging member passing through said chamber, shot in said chamber and surrounding said stud, a bushing axially slidable on said stud, and engageable with the shot in said chamber, and means for urging said bushing into engagement with said shot, so as to cause said shot to form a rigid medium between said chamber and said stud to lock out the floating movement of said work engaging member.

6. In a locking device for two relatively movable members, a chamber in one of said members, means fixed on said other member projecting through said chamber, shot in said chamber and surrounding said projecting member, and means for applying pressure to the shot in said chamber whereby it forms a rigid medium between said chamber and said projecting member so as to prevent relative movement between said relatively movable members.

7. In a chuck adapted to grip a prelocated work piece on the axis of rotation thereof; a rotary chuck body; a work engaging member floatingly mounted on said chuck body for movement relative to said axis of rotation; a fixed abutment mounted in said work engaging member having a pair of work contacting surfaces; an equalizing abutment mounted in said work engaging member having a pair of work engaging surfaces; a clamping member mounted on said work engaging member; means associated with the said clamping member and said work engaging member for rendering said clamping member operative to engage its work engaging abutment with said work piece, means including a clamping abutment carried by said clamping member and so located thereon that a clamping force exerted thereby on the work piece extends between said fixed and said equalizing abutments, said work piece being urged by a component thereof against said fixed abutment, said equalizing abutment automatically adjusting itself so that the components of said force are of substantially equal magnitude whereby the work piece is rigidly held against all of said contacting surfaces by a substantially equal force.

8. In a chuck adapted to grip a prelocated work piece on the axis of rotation thereof; a rotary chuck body; a work engaging member floatingly mounted on said chuck body for movement relative to said axis of rotation; a fixed abutment mounted in said work engaging member having a pair of work contacting surfaces; an equalizing abutment mounted in said work engaging member having a pair of work engaging surfaces; a clamping member mounted on said work engaging member; means associated with said clamping member and work engaging member for rendering said clamping member operative to engage its work engaging abutment with said work piece, means including a threaded member carried by said clamping member and bearing directly on said work piece and so located on said clamping member that a clamping force exerted thereby on the work piece extends between said fixed and said equalizing abutments, said work piece being urged by a component thereof against said fixed abutment, said equalizing abutment automatically adjusting itself so that the components of said force are of substantially equal magnitude whereby the work piece is rigidly held against all of said contacting surfaces by a substantially equal force.

9. In a chuck adapted to grip a prelocated work piece on the axis of rotation thereof; a rotary chuck body; a work engaging member floatingly mounted on said chuck body for movement relative to said axis of rotation; a fixed abutment mounted in said work engaging member having a pair of work contacting surfaces; an equalizing abutment mounted in said work engaging member having a pair of work engaging surfaces; a clamping member mounted on said work engaging member; means associated with said clamping member and work engaging member for rendering said clamping member operative to engage its work engaging abutment with said work piece, means including a clamping abutment carried by said clamping member and so located thereon that a clamping force exerted thereby on the work piece extends between said fixed and said equalizing abutments, said work piece being urged by a component thereof against said fixed abutment, said equalizing abutment automatically adjusting itself so that the components of said force are of substantially equal magnitude whereby the work piece is rigidly held against all of said contacting surfaces by a substantially equal force; said work engaging member including a plurality of sections, means pivotally connecting together two of said sections including an eccentrically adjustable cam.

WILLIAM F. GROENE.
HAROLD J. SIEKMANN.